United States Patent
Noh

(10) Patent No.: US 11,180,081 B2
(45) Date of Patent: Nov. 23, 2021

(54) REAR-SIDE ALARM DEVICE AND REAR-SIDE ALARM METHOD THEREOF

(71) Applicant: MANDO CORPORATION, Pyeongtaek-si (KR)

(72) Inventor: Tae Bong Noh, Yongin-si (KR)

(73) Assignee: Mando Corporation, Pyeongtaek-si (KR)

( * ) Notice: Subject to any disclaimer, the term of this patent is extended or adjusted under 35 U.S.C. 154(b) by 0 days.

(21) Appl. No.: 16/513,217

(22) Filed: Jul. 16, 2019

(65) Prior Publication Data

US 2020/0031276 A1 Jan. 30, 2020

(30) Foreign Application Priority Data

Jul. 25, 2018 (KR) .................. 10-2018-0086405

(51) Int. Cl.
*B60Q 9/00* (2006.01)
*B60W 40/10* (2012.01)
(Continued)

(52) U.S. Cl.
CPC ............ *B60Q 9/008* (2013.01); *B60W 40/10* (2013.01); *B60W 40/12* (2013.01); *B60R 11/04* (2013.01); *B60W 2420/42* (2013.01)

(58) Field of Classification Search
CPC ....... B60Q 9/006; B60Q 9/008; B60W 40/10; B60W 40/12; B60W 2420/42;
(Continued)

(56) References Cited

U.S. PATENT DOCUMENTS 6,268,803 B1 * 7/2001 Gunderson ........... G01S 13/878
340/903
6,606,027 B1 * 8/2003 Reeves ..................... G01S 7/04
340/436
(Continued)

FOREIGN PATENT DOCUMENTS

JP 11-124051 A 5/1999
KR 10-2013-0059702 A 6/2013
(Continued)

OTHER PUBLICATIONS

Office Action issued in corresponding Korean Application No. 10-2018-0086405, dated Jul. 1, 2019.
(Continued)

*Primary Examiner* — Orlando Bousono
(74) *Attorney, Agent, or Firm* — Morgan, Lewis & Bockius LLP

(57) ABSTRACT

A rear-side alarm device and a rear-side alarm method thereof. The rear-side alarm device includes a sensor and a controller. The sensor monitors a rear area or a rear-side area of a vehicle. If a trailer connected to the vehicle is detected, the controller sets a system deactivation area and a system activation area, based on status information of the trailer, and controls an alarm operation to be performed by judging whether or not another vehicle has entered into the system activation area. The rear-side alarm device can operate normally even in the case in which a trailer is connected to a vehicle, thereby providing driving safety to a driver.

19 Claims, 11 Drawing Sheets

(51) Int. Cl.
*B60W 40/12* (2012.01)
*B60R 11/04* (2006.01)

(58) Field of Classification Search
CPC ................ B60R 11/04; G01S 13/931; G01S 2013/93272; G08G 1/167
See application file for complete search history.

(56) References Cited

U.S. PATENT DOCUMENTS

| | | | | |
|---|---|---|---|---|
| 9,211,889 | B1* | 12/2015 | Hoetzer | B60Q 5/006 |
| 9,527,528 | B1* | 12/2016 | Harrison | B62D 15/0265 |
| 2003/0141965 | A1* | 7/2003 | Gunderson | B60Q 9/008 |
| | | | | 340/431 |
| 2004/0046647 | A1* | 3/2004 | Reeves | B60Q 9/006 |
| | | | | 340/435 |
| 2005/0073433 | A1* | 4/2005 | Gunderson | B60Q 9/006 |
| | | | | 340/903 |
| 2005/0242931 | A1* | 11/2005 | Gunderson | B60Q 9/008 |
| | | | | 340/431 |
| 2006/0119473 | A1* | 6/2006 | Gunderson | G01S 13/931 |
| | | | | 340/435 |
| 2008/0024283 | A1* | 1/2008 | Kim | B60Q 9/006 |
| | | | | 340/431 |
| 2014/0277941 | A1* | 9/2014 | Chiu | B62D 13/06 |
| | | | | 701/41 |
| 2016/0101730 | A1* | 4/2016 | Shehan | G01S 13/88 |
| | | | | 340/431 |
| 2017/0057413 | A1* | 3/2017 | Shehan | G01S 17/931 |
| 2017/0116796 | A1* | 4/2017 | Kondou | F16D 57/00 |
| 2017/0174262 | A1* | 6/2017 | Kobayashi | G01S 19/14 |
| 2017/0334413 | A1* | 11/2017 | Murakoshi | B60R 1/00 |
| 2017/0363727 | A1 | 12/2017 | Prasad et al. | |
| 2017/0363728 | A1* | 12/2017 | Prasad | B60W 40/12 |
| 2019/0077308 | A1* | 3/2019 | Kashchenko | G06N 3/08 |
| 2019/0100132 | A1* | 4/2019 | Plessis | B60Q 1/22 |
| 2019/0189015 | A1* | 6/2019 | Gesch | B60R 1/0612 |
| 2020/0001778 | A1* | 1/2020 | Lotz | B60Q 1/40 |

FOREIGN PATENT DOCUMENTS

| | | |
|---|---|---|
| KR | 10-1803745 B1 | 12/2017 |
| KR | 10-2018-0047656 A | 5/2018 |

OTHER PUBLICATIONS

Notice of Allowance issued in Korean Patent Application No. 10-2018-0086405 dated Mar. 17, 2020.

* cited by examiner

REAR-SIDE ALARM DEVICE AND REAR-SIDE ALARM METHOD THEREOF

CROSS REFERENCE TO RELATED APPLICATION

This application claims priority to Korean Patent Application No. 10-2018-0086405, filed on Jul. 25, 2018, which is hereby incorporated by reference for all purposes as if fully set forth herein.

BACKGROUND

Field

The present disclosure relates to a rear-side alarm device and a rear-side alarm method thereof.

Description of Related Art

A rear-side alarm device is a device that warns a driver of a traveling vehicle if there is possibility that an object detected in a rear-side area of the vehicle may collide with the vehicle.

The rear-side alarm device may include a blind spot detection (BSD) system that warns a driver by detecting an object present in a rear alarm area of a vehicle, a lane change assist (LCA) system that warns a driver of a lane-changing vehicle by judging the possibility that another vehicle, approaching to the host vehicle at a high speed in a rear-side area, may collide with the host vehicle, or the like.

The rear-side alarm device operates normally in situations in which rear sensors are not blocked by an obstacle. When the rear sensors are blocked by an obstacle, the rear-side alarm device may shut the system down or may malfunction so that an alarm operation is limited.

In addition, a vehicle may be connected to a trailer fabricated to carry a load or a camping trailer. Since rear sensors disposed on the vehicle constantly detect the trailer, the rear sensors may be blocked by the trailer in the same manner as an obstacle. Thus, the rear-side alarm device may shut the system down or may malfunction.

BRIEF SUMMARY

Various aspects of the present disclosure provide a rear-side alarm device and a rear-side alarm method able to operate normally, even in the case in which a trailer is connected to a vehicle.

Also provided are a rear-side alarm device and a rear-side alarm method able to improve driving safety of a vehicle to which a trailer is connected by minimizing a possibility that the vehicle may collide with another vehicle.

According to an aspect of the present disclosure, a rear-side alarm device includes: a sensor monitoring a rear area or a rear-side area of a vehicle; and a controller, if a trailer connected to the vehicle is detected, setting a system deactivation area and a system activation area, based on status information of the trailer, and controls an alarm operation to be performed by judging whether or not another vehicle has entered into the system activation area.

According to another aspect of the present disclosure, a rear-side alarm method includes: monitoring a rear area or a rear-side area of a vehicle; if a trailer connected to the vehicle is detected, setting a system deactivation area and a system activation area, based on status information of the trailer; and performing an alarm operation by judging whether or not another vehicle has entered into the system activation area.

According to the present disclosure, the rear-side alarm device and the rear-side alarm method can operate normally, even in the case in which a trailer is connected to a vehicle.

In addition, according to the present disclosure, the rear-side alarm device and the rear-side alarm method can improve driving safety of a vehicle to which a trailer is connected by minimizing a possibility that the vehicle may collide with another vehicle.

BRIEF DESCRIPTION OF THE DRAWINGS

The above and other objects, features, and advantages of the present disclosure will be more clearly understood from the following detailed description when taken in conjunction with the accompanying drawings, in which.

DETAILED DESCRIPTION

Hereinafter, specific embodiments of the present disclosure will be described in detail with reference to the accompanying drawings. It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element.

The term "trailer" used herein refers to a non-powered vehicle fastened to a vehicle using a physical connection device to move along with the traveling of the vehicle. That is, a trailer may be a container on wheels which is pulled by a car or other vehicle and which is used for transporting large or heavy items. Hereinafter, the container or vehicle will be described as a trailer for the sake of explanation and understanding, but the present disclosure is not limited thereto.

In addition, the term "sensor" used herein refers to a device that monitors a rear area or a rear-side area of a vehicle. The rear-side area may also be referred to as a rear quadrant area. Only one of the terms "rear" and "rear quadrant" may be used, as required. However, it should be understood that the terms "rear" and "rear quadrant" indicate surroundings of the vehicle and embodiments of the present disclosure are by no means limited to a specific direction.

Figure 1:
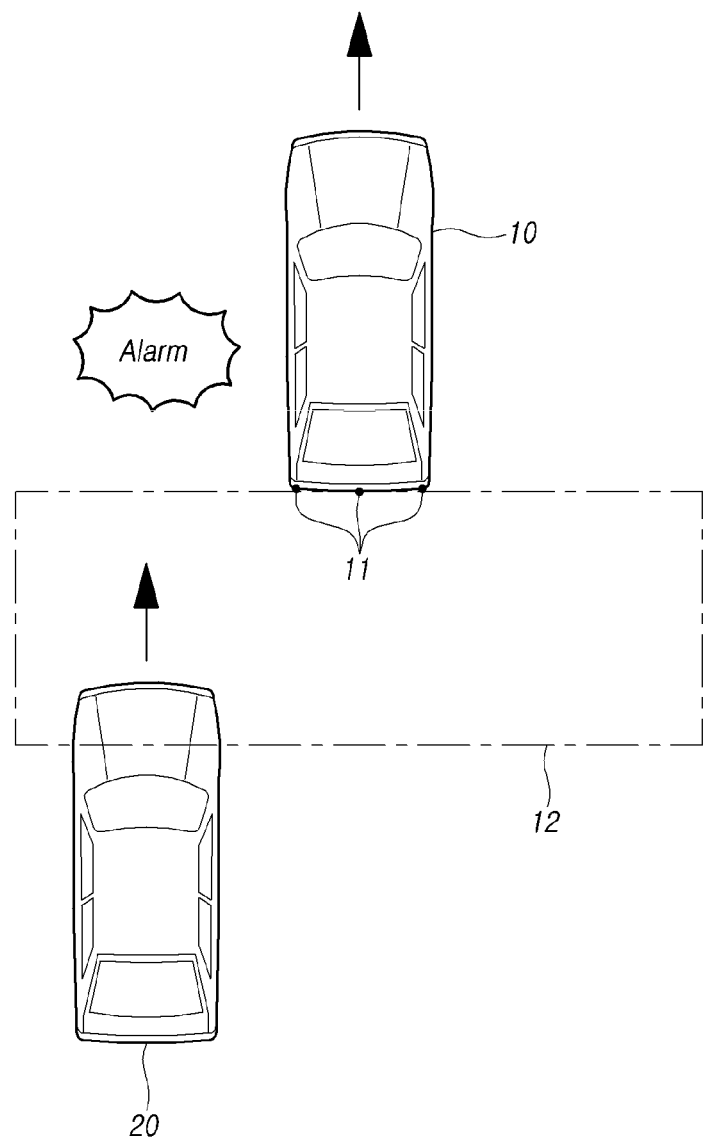
FIG. 1 illustrates an example of an alarm operation performed in a vehicle, to which a rear-side alarm device according to the present disclosure is mounted.
Figure 2:
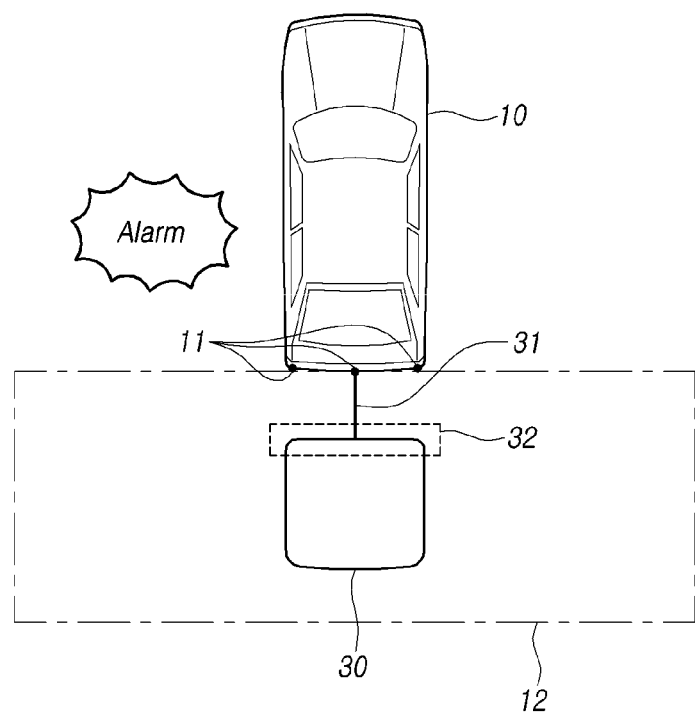
FIG. 2 illustrates another example of the alarm operation performed in the vehicle, to which the rear-side alarm device according to the present disclosure is mounted.

FIG. 1 illustrates an example of an alarm operation performed in a vehicle 10, to which a rear-side alarm device according to the present disclosure is mounted, while FIG. 2 illustrates another example of the alarm operation performed in the vehicle 10, to which the rear-side alarm device according to the present disclosure is mounted.

The rear-side alarm device according to the present disclosure (not shown) is a device that warns a driver of a traveling vehicle if there is possibility that an object detected from a rear-side (or rear quadrant) area of the vehicle may collide with the vehicle, to which the rear-side alarm device is mounted. The rear-side alarm device may include a system, such as a blind spot detection (BSD) system or a lane change assist (LCA) system, which provides an alarm signal when an object, having entered into a rear alarm area 12, is detected.

Referring to FIG. 1, rear sensors 11 mounted on the rear portion of the traveling vehicle 10 may monitor the rear area of the vehicle 10.

In this case, when another vehicle 20 has entered into the rear alarm area 12, an alarm operation is performed in the vehicle 10 to warn the driver of the vehicle.

Although the three rear sensors 11 are illustrated as being mounted on the rear portion of the vehicle 10 in FIG. 1, the present disclosure is not limited thereto. The range of the rear alarm area 12, illustrated in FIG. 1, is provided only for a better understanding, and the present disclosure is not limited thereto also.

Referring to FIG. 2, the vehicle 10 may travel, with a trailer 30 including a connection member 31 being connected thereto. Since the sensors 11 detect the trailer 30 located in the rear alarm area 12, an abnormal alarm operation may be performed in the vehicle 10, which is problematic.

In another aspect, since the trailer 30 connected to the vehicle 10 remains at a fixed distance from the vehicle, the rear sensors 11 recognize that the front end 32 of the trailer 30 is present in the same position whenever the front end 32 of the trailer 30 is detected. Thus, the rear sensors 11 may be blocked by the trailer 30.

If the rear sensors are blocked by the trailer 30, the rear-side alarm device (not shown) may shut down the system so that no alarm operation is performed in the vehicle 10. When the vehicle 10 changes lanes in this situation, it may be difficult for the vehicle 10 to avoid a collision with another vehicle 20, which is problematic.

Accordingly, the present disclosure is intended to provide a rear-side alarm device and a rear-side alarm method able to overcome the above-described problem.

Figure 3:
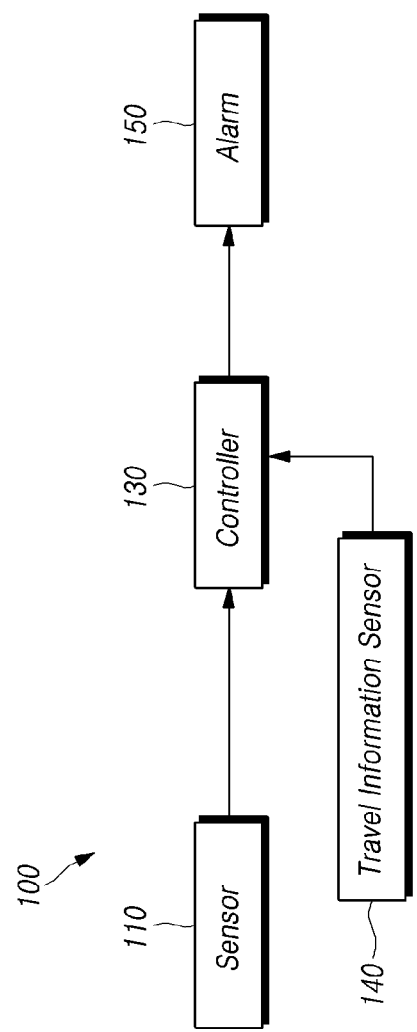
FIG. 3 is a block diagram illustrating a configuration of a rear-side alarm device according to the present disclosure.

FIG. 3 is a block diagram illustrating a configuration of a rear-side alarm device 100 according to the present disclosure.

Referring to FIG. 3, the rear-side alarm device 100 according to the present disclosure may include a sensor 110, a controller 130, and an alarm 150.

The sensor 110 may monitor a rear area of the vehicle 10. The sensor 110 may include one or more rear sensors 11, which may be mounted on the rear portion of the vehicle 10.

For example, the sensor 110 may include three rear sensors 11, which may be arranged at equal distances from each one another on the rear bumper of the vehicle 10.

Here, the sensor 110 may mean an ultrasonic sensor, a camera, an infrared (IR) camera, a radar, a Lidar sensor, or the like.

The sensor 110 outputs detection data, obtained by monitoring the rear area of the vehicle 10, to the controller 130.

The controller 130 may judge whether or not the vehicle 10 and the trailer 30 are connected.

A variety of methods may be used to judge whether or not the trailer 30 is connected to the vehicle 10.

For example, the controller 130 judges that the trailer 30 is connected to the vehicle 10 if the distance between the rear sensors 11 and the front end 32 of the trailer 30 remains constant.

If the trailer 30 is judged as being connected to the vehicle 10, the controller 130 generates a connection complete signal.

In addition, if the trailer 30 is judged as being connected to the vehicle 10, the controller 130 may set a system deactivation area and a system activation area, based on status information regarding the trailer 30.

Specifically, the controller 130 may process the status information of the trailer 30 by receiving a connection complete signal, detection data, and the like, and set the system deactivation area, based on the processed status information of the trailer 30, thereby setting the system activation area by.

The status information of the trailer 30 means all pieces of information related to the trailer 30, including the length or width of the trailer 30, the positions of the wheels of the trailer 30, information regarding the longitudinal rear end of the trailer 30, a speed or angular velocity of the trailer 30, a steering angle of the trailer 30, and the like.

Here, the controller 130 may obtain the status information of the trailer 30 from the detection data by extraction, by estimation based on the detection data, or from the modeled trailer 30 by determination. However, the present disclosure is not limited thereto.

Here, the system activation area means an area in which the alarm 150 operates, while the system deactivation area means an area in which the operation of the alarm 150 is limited.

The system activation area and the system deactivation area may be included in the rear alarm area 12. Thus, if the system deactivation area is set in the rear alarm area 12, the system activation area may be set in remaining portions of the rear alarm area 12, except for the system deactivation area.

Here, the controller 130 may process the status information of the trailer 30 by additionally receiving travel data from a travel information sensor 140.

The travel information sensor 140 may transfer the travel data, including all pieces of information related to the travel of the vehicle 10, to the controller 130. The travel information sensor 140 may include a sensor (not shown) detecting travel information of the vehicle 10.

For example, the travel information sensor 140 may include a steering angle sensor, a vehicle speed sensor, an acceleration sensor, a yaw rate sensor, and the like.

The alarm 150 may perform an alarm operation, based on the result of judging whether or not an obstacle is present in the rear alarm area 12.

If the system deactivation area and the system activation area are set, the alarm 150 may perform the alarm operation by judging whether or not another vehicle 20 has entered into the system activation area.

In addition, if the system deactivation area and the system activation area are set, the controller 130 may control the alarm 150 to perform the alarm operation by judging whether or not another vehicle 20 has entered into the system activation area. That is, the controller 130 may output an alarm control signal to the alarm 150.

Here, the term "alarm" includes any type of alarming means, such as an alarm sound, an alarm light, or vibration of the steering wheel, by which a driver may be warned.

The above-described controller 130 may be implemented as one selected from among, but not is limited to, a microcontroller unit (MCU), an integrated circuit (IC), and a piece of software.

The rear-side alarm device 100 according to the present disclosure may set the system activation area and the system deactivation area to be independent of each other, so that the system can remain active even in the case in which the vehicle 10 and the trailer 30 are connected.

Hereinafter, a method of setting the system activation area and the system deactivation area will be described in detail.

Figure 4:
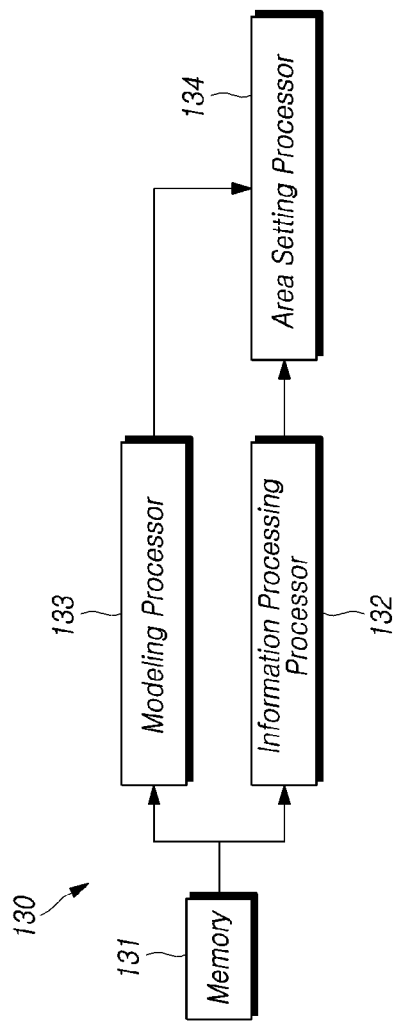
FIG. 4 is a block diagram illustrating a configuration of the controller of the rear-side alarm device according to the present disclosure.

FIG. 4 is a block diagram illustrating a configuration of the controller 130 of the rear-side alarm device 100 according to the present disclosure.

Referring to FIG. 4, the controller 130 of the rear-side alarm device 100 according to the present disclosure may include a memory 131, an information processing processor 132, a modeling processor 133, and an area setting processor 134.

The memory 131 may accumulatively store various pieces of data, such as detection data input from the sensor 110 and travel data input from the travel information sensor 140.

The information processing processor 132 may process information necessary for setting the system deactivation area, using various pieces of data stored in the memory 131, and output the processed information to the area setting processor 134.

For example, the information processing processor 132 may extract information regarding at least one of the size of the trailer 30, the position of the trailer 30, or the behavior of the trailer 30, corresponding to the status information of the trailer 30, from the detection data stored in the memory 131, and output the extracted information to the area setting processor 134.

In addition, in the trailer 30, various pieces of information, such as the size, the length, the positions of the wheels, and the position of the longitudinal rear end, are different depending on the product, and a user cannot directly obtain such information. Thus, in some cases, it may be difficult for the information processing processor 132 to directly obtain the status information of the trailer 30.

Accordingly, the information processing processor 132 may estimate the status information of the trailer 30, based on the accumulated detection data. For example, the information processing processor 132 may estimate size information (i.e. information regarding the size), position information (i.e. information regarding the position), and behavior information (i.e. information regarding the behavior) of the trailer 30, based on the accumulated detection data.

In addition, at least one of the size information of the trailer or the position information of the trailer may be produced using image information obtained by an image sensor mounted to the vehicle to capture images from an area including the trailer or may be set based on an input signal input via an input interface.

In an example, information regarding the size of the trailer may be produced by processing the image information obtained using the image sensor disposed to capture images from the rear area of the vehicle. That is, shape information of the trailer may be extracted from the image information obtained using the image sensor disposed to capture images from the rear area of the vehicle, and the size information of the trailer may be produced using information, such as the shape of the trailer and an angle set for image capturing.

In another example, the size information of the trailer may be set based on the input signal input via the input interface provided within the vehicle. That is, the user may obtain accurate size information of the trailer by inputting specification information (i.e. information regarding the specification) of the trailer to the input interface. Alternatively, the size information of the trailer may be input via an input device connected to the vehicle via wired and/or wireless communications.

In another example, the position information of the trailer may be produced as relative position information of the trailer with respect to the vehicle, based on the image information obtained by the image sensor.

In another example, the position information of the trailer may be set based on information regarding initial position of the trailer, input via the input interface.

In addition, the behavior information of the trailer may be produced by receiving data detected by a behavior sensor mounted to the trailer.

For example, the trailer may include an acceleration sensor or a position change sensor. The behavior sensor mounted to the trailer may be connected to the vehicle via wired and/or wireless communications to transfer the behavior information, such as acceleration detection information or change detection information. The vehicle may detect a change in the position of the trailer or a change in the angle of the trailer with respect to the vehicle, using the behavior information of the trailer. The accuracy of detection performed in this manner can be higher than the accuracy of detection performed using sensors mounted to the vehicle.

In addition, the modeling processor 133 may generate modeling factors by processing pieces of information stored in the memory 131, such as the detection data, the travel data, and the input status information of the trailer 30.

Here, the modeling includes images, a modeling formula, and the like. The modeling formula may mean a mathematical representation, such as motion equation, of a modeled object. Modeling factors mean factors applied to the modeling formula.

The modeling processor 133 may model the vehicle 10 and the trailer 30, determine actual behavior information of the trailer 30 necessary for setting the system deactivation area by reflecting the generated modeling factors in the modeling, and output the determined behavior information to the area setting processor 134.

The area setting processor 134 may set the system deactivation area by receiving various pieces of information from at least one processor of the information processing processor 132 or the modeling processor 133.

For example, the area setting processor 134 may set the system deactivation area, based on the status information of the trailer 30 extracted by the information processing processor 132.

Since it is difficult to directly extract the status information of the trailer 30, the area setting processor 134 may set the system deactivation area, based on the estimated status information of the trailer 30.

For example, the area setting processor 134 may set a critical range of the system deactivation area, based on the estimated size information, set the system deactivation area corresponding to the position of the trailer 30, based on the estimated position information, and predict and set a transition of the system deactivation area, based on the estimated behavior information.

Here, the critical range of the system deactivation area means a limit range in which the system deactivation area is independent of the system activation area. The critical range of the system deactivation area may correspond to the width of the trailer 30.

The area setting processor 134 may set remaining portions of the rear alarm area 12, except for the system deactivation area, as the system activation area.

As described above, the controller 130 of the rear-side alarm device 100 according to the present disclosure may estimate the status information of the trailer based on the accumulated detection data, and set the system deactivation area based on the estimated status information.

Each of the above-described processors may be implemented as a single processor or a combination of one or more processors. Alternatively, the above-described single processor may be implemented as two or more separate processors.

Figure 5:
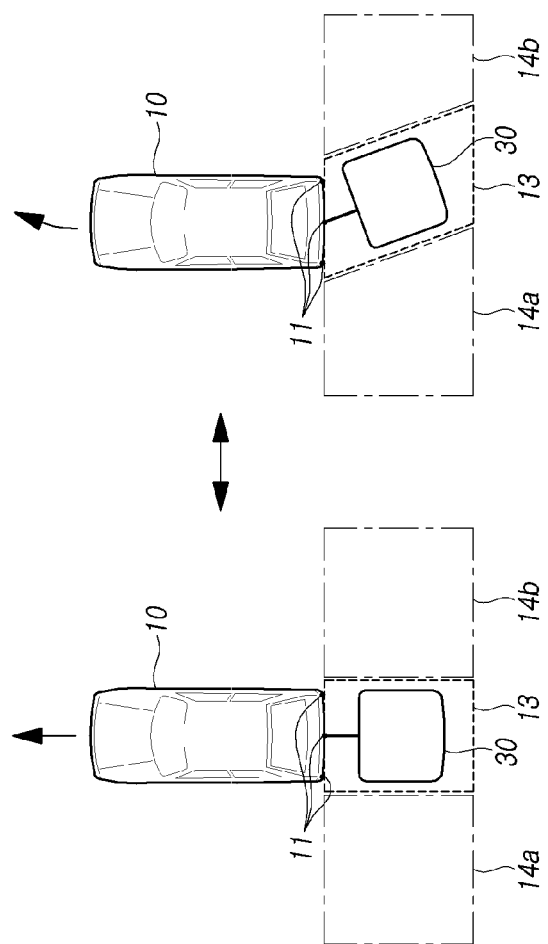
FIG. 5 is a diagram illustrating a system deactivation area and a system activation area in a case in which the trailer is connected to the vehicle, to which the rear-side alarm device according to the present disclosure is mounted.

FIG. 5 is a diagram illustrating a system deactivation area 13 and a system activation area 14 in a case in which the trailer 30 is connected to the vehicle 10, to which the rear-side alarm device 100 according to the present disclosure is mounted.

Referring to FIG. 5, if the trailer 30 is judged as being connected to the vehicle 10, the rear-side alarm device 100 according to the present disclosure, mounted to the vehicle 10, sets the system deactivation area 13 and the system activation area 14, based on the status information of the trailer 30.

Here, the rear-side alarm device 100 according to the present disclosure, mounted to the vehicle 10, may set only a single system activation area of a first system activation area 14*a* or a second system activation area 14*b*, depending on the driving condition of the vehicle 10.

In addition, the trailer 30 connected to the vehicle 10 may move linearly or turn, depending on the driving direction of the vehicle 10. Here, the rear-side alarm device 100 according to the present disclosure may reset the system deactivation area 13 and the system activation area 14, corresponding to the behavior of the trailer 30 in the driving direction of the vehicle 10.

In an example, when the vehicle 10, to which the rear-side alarm device 100 according to the present disclosure is mounted, turns after having moved linearly, the first system activation area 14*a* is reset to expand, the second system activation area 14*b* is reset to contract, and the system deactivation area 13 is reset to be inclined in the turning direction.

In another example, when the vehicle 10, to which the rear-side alarm device 100 according to the present disclosure is mounted, moves linearly after having turned, the first system activation area 14*a* is reset to contract, the second system activation area 14*b* is reset to expand, and the system deactivation area 13 is reset to be aligned with the linear driving direction.

Accordingly, the rear-side alarm device 100 according to the present disclosure may predict and set the transition of the system deactivation area 13, corresponding to the behavior of the trailer 30 in the driving direction of the vehicle 10. Here, the transition of the system deactivation area 13 means a movement of the area.

Since the trailer 30 moves depending on the driving condition of the vehicle 10, the behavior information of the trailer 30 may be predicted using the travel information of the vehicle 10.

Hereinafter, a method of setting the system deactivation area 13 and the system activation area 14 by predicting the behavior information of the trailer 30, based on the travel information of the vehicle 10, will be described in detail.

Figure 6A:
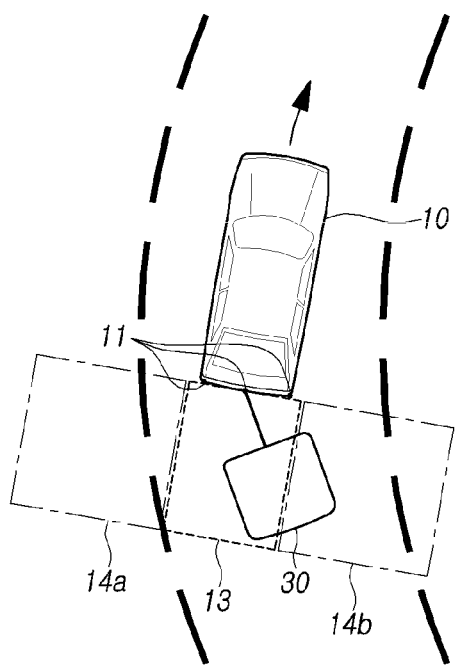
FIGS. 6A to 6C are diagrams illustrating the system deactivation area and the system activation area, set by modeling the vehicle and the trailer.
Figure 6B:
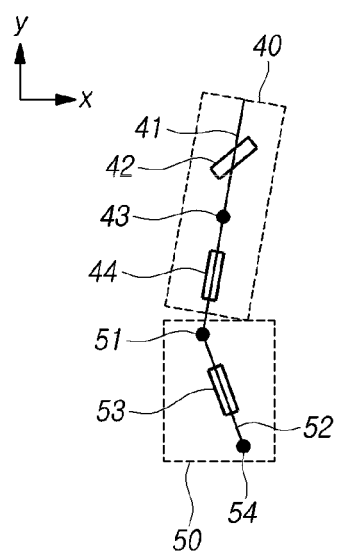
Figure 6C:
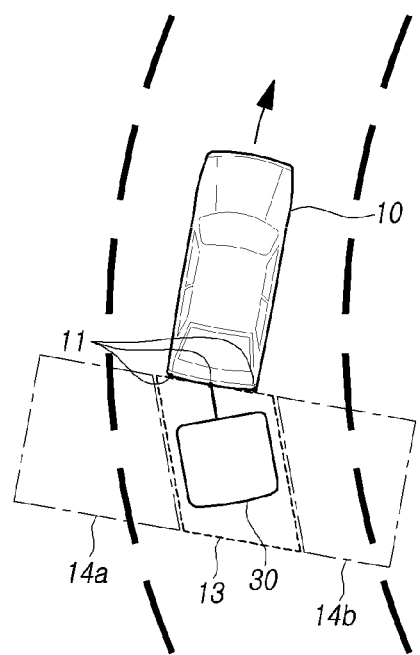

FIGS. 6A to 6C are diagrams illustrating the system deactivation area 13 and the system activation area 14, set by modeling the vehicle 10 and the trailer 30.

Referring to FIG. 6A, when the vehicle 10 is steered, the trailer 30 moves following the direction of the vehicle. For example, when the vehicle 10 is turned to the right, the trailer 30 moves to the right also.

Here, the system activation area 14 and the system deactivation area 13, set before the steering of the vehicle 10, are reset depending on the behavior of the vehicle 10 and the trailer 30.

Referring to FIG. 6B, the controller 130 may model the vehicle 10 and the trailer 30 connected to the vehicle 10, determine behavior information of the trailer 30 by reflecting a modeling factor of the vehicle 10 and a modeling factor of the trailer 30 in the modeling, and predict and set a transition of the system deactivation area 13, based on the determined behavior information.

As described above, the modeling includes a modeling image, a modeling formula, and the like. The modeling may be selected from among a variety of modeling methods including known modeling methods, such as kinematic modeling and bicycle modeling, and new modeling methods.

Here, the modeling factors may include a vehicle speed, an acceleration, a center of mass, steering angles of the front wheels of the vehicle 10, the positions of the wheels, the position of the longitudinal rear end, and the like.

The controller 130 may reflect the modeling factor of the vehicle 10 and the modeling factor of the trailer 30 in the modeling by applying the modeling factors to the modeling formula.

For example, the controller 130 models the vehicle 10 by bicycle modeling, using information regarding an axle, the position of the center of mass, the distance between the front wheel and the center of mass, the distance between the rear wheel and the center of mass, and the like.

In addition, the controller 130 models the trailer 30 by trailer modeling realized by simulation, using information regarding the position of the connection member 31, the position of the wheel, the position of the longitudinal rear end, and the like.

Here, a modeling vehicle 40 includes a modeling first axle 41, a modeling front wheel 42, a center of mass 43, and a modeling rear wheel 44, while a modeling trailer 50 includes a modeling connection member 51, a modeling second axle 52, a modeling wheel 53, and a modeling rear end 54.

The controller 130 produces behavior information of the modeling vehicle 40 by reflecting the modeling factor of the vehicle 10, generated by processing the travel data of the vehicle 40, in the bicycle modeling.

The modeling factor of the trailer 40, generated by processing the status information of the trailer 40, and the produced behavior information of the modeling vehicle 40 are reflected in the trailer modeling, by which behavior information of the modeling trailer 40 is produced.

Here, the behavior information of the modeling vehicle 40 and the behavior information of the modeling trailer 40 may be produced by a modeling formula or algorithm.

The controller 130 determines the behavior information of the trailer 40 by processing the produced behavior information of the modeling processor 40 as behavior information of the actual trailer 40.

Referring to FIG. 6C, the controller 130 predicts and sets a transition of the system deactivation area 13, based on the determined behavior information, and sets the system activation area 14, based on the set system deactivation area 13.

If size information of the trailer 30 is additionally stored, the controller 130 may set the system deactivation area 13 by additionally setting a critical range of the system deactivation area 13.

However, specific pieces of information regarding the trailer 30, such as the size, the length, the positions of the wheels, and the position of the longitudinal rear end of the trailer 30, are difficult to directly obtain. Thus, it may be difficult for the controller 130 to directly generate the position of the modeling wheel 53, the position of the modeling rear end 54, and the like, included in the modeling factor of the trailer 30.

Accordingly, the controller 130 may accumulatively store the detection data input@ from the sensor 110, estimate the status information of the trailer 30, including at least one of the position information of the longitudinal rear end of the trailer 30 or the position information of the wheel of the trailer 30, based on the accumulated detection data, and generate the modeling factor of the trailer 30, based on the estimated status information.

Figure 7A:
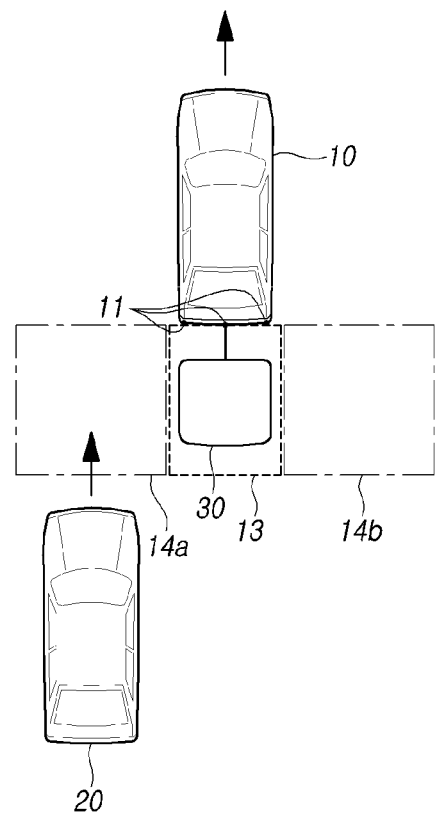
FIGS. 7A and 7B illustrate another example of the alarm operation performed in the vehicle, to which the rear-side alarm device according to the present disclosure is mounted.
Figure 7B:
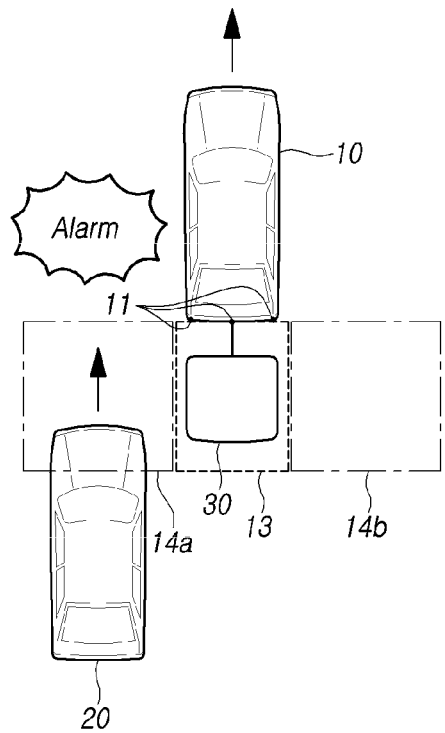

FIGS. 7A and 7B illustrate another example of the alarm operation performed in the vehicle 10, to which the rear-side alarm device 100 according to the present disclosure is mounted.

Referring to FIG. 7A, the rear-side alarm device 100 according to the present disclosure, mounted to the vehicle 10, may judge whether or not another vehicle 20 has entered into the rear-side (or rear quadrant) area of the vehicle 10, based on the set system deactivation area 13 and the set system activation area 14.

For example, the rear-side alarm device 100 according to the present disclosure judges whether or not another vehicle 20 has entered into the first system activation area 14a.

Referring to FIG. 7B, if another vehicle 20 has entered into the system activation area 14, the rear-side alarm device 100 according to the present disclosure, mounted to the vehicle 10, performs an alarm operation.

For example, if another vehicle 20 has entered into the first system activation area 14a, the rear-side alarm device 100 according to the present disclosure, mounted to the vehicle 10, performs the alarm operation.

As described above, even in the case in which the vehicle 10 is connected to the trailer 30, the vehicle 10 may avoid a collision with another vehicle 20 present in the rear-side area.

Hereinafter, a rear-side alarm method able to perform all of the above-described operations of the present disclosure will be described with reference to FIG. 8.

Figure 8:
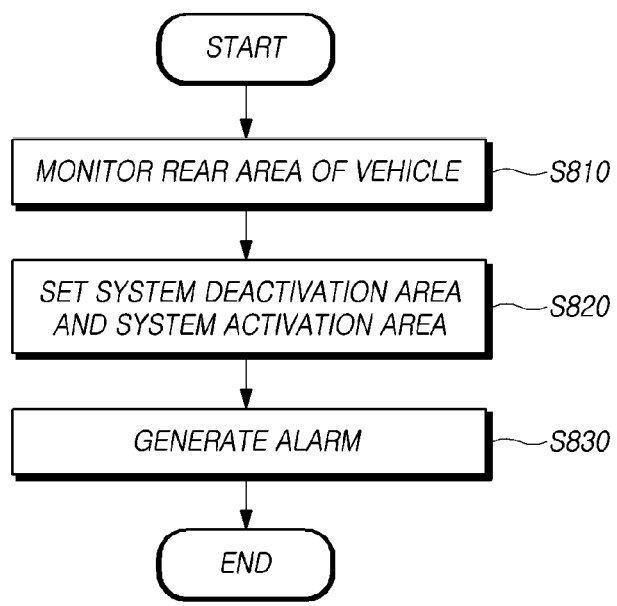
FIG. 8 is a flowchart illustrating a rear-side alarm method according to the present disclosure.

FIG. 8 is a flowchart illustrating the rear-side alarm method according to the present disclosure.

With reference to FIG. 8, the rear-side alarm method according to the present disclosure may include: step S810 of monitoring the rear area of the vehicle 10; step S820 of setting the system deactivation area 13 and the system activation area 14, based on status information of the trailer 30, if the trailer 30 connected to the vehicle 10 is detected; and step S830 of performing an alarm operation by judging whether or not another vehicle 20 has entered into the system activation area 14.

Here, in the step S820 of setting the system deactivation area 13 and the system activation area 14, detection data generated in the step S810 of monitoring the rear area of the vehicle 10 may be accumulatively stored, the status information of the trailer 30 may be estimated based on the accumulated detection data, and the system deactivation area 13 may be set based on the estimated status information.

Here, the step S820 of setting the system deactivation area 13 and the system activation area 14 may accumulatively store the detection data generated in the step S810 of monitoring the rear area of the vehicle 10, estimate size information regarding the size of the trailer 30, based on the accumulated detection data, and set a critical range of the system deactivation area 13 based on the estimated size information.

In addition, the step S820 of setting the system deactivation area 13 and the system activation area 14 may estimate behavior information of the trailer 30, based on the accumulated detection data, and predict and set a transition of the system deactivation area 13, based on the estimated behavior information.

As set forth above, the rear-side alarm device and the rear-side alarm method, provided according to the present disclosure, can operate normally, even in the case in which a trailer is connected to a vehicle.

In addition, according to the present disclosure, the rear-side alarm device and the rear-side alarm method can improve driving safety of a vehicle to which a trailer is connected by minimizing a possibility that the vehicle may collide with another vehicle.

The foregoing descriptions and the accompanying drawings have been presented in order to explain certain principles of the present disclosure by way of example. A person having ordinary skill in the art to which the present disclosure relates could make various modifications and variations by combining, dividing, substituting for, or changing the elements without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A rear-side alarm device comprising:
    a sensor monitoring a rear area or a rear-side area of a vehicle; and
    a controller, if a trailer connected to the vehicle is detected, setting a system deactivation area and a system activation area based on status information of the trailer, and controlling an alarm operation to be performed by judging whether or not another vehicle has entered into the system activation area,
    wherein the controller resets the system deactivation area and the system activation area based on dynamic behavior information of the trailer in a driving direction of the vehicle,
    wherein, when the vehicle turns by changing a steering angle, the controller resets the system activation area to be expanded or contracted in a width direction of the vehicle and adjusts a shape of the system deactivation area to be aligned with a moving direction of the trailer, such that the trailer is entirely inside the system deactivation area and the system deactivation area and the trailer are directed to be tangential to a direction of vehicle steering.

2. The rear-side alarm device according to claim 1, wherein the controller accumulatively stores detection data input from the sensor, estimates the status information of the trailer based on the accumulated detection data, and sets the system deactivation area based on the estimated status information.

3. The rear-side alarm device according to claim 1, wherein the controller accumulatively stores detection data input from the sensor, estimates size information of the trailer based on the accumulated detection data, and sets a critical range of the system deactivation area based on the estimated size information.

4. The rear-side alarm device according to claim 1, wherein the controller accumulatively stores detection data input from the sensor, estimates position information of the trailer based on the accumulated detection data, and sets the system deactivation area corresponding to a position of the trailer based on the estimated position information.

5. The rear-side alarm device according to claim 1, wherein the controller accumulatively stores detection data input from the sensor, estimates behavior information of the trailer based on the accumulated detection data, and predicts and sets the system deactivation area based on the estimated behavior information.

6. The rear-side alarm device according to claim 1, wherein the controller models the vehicle and the trailer connected to the vehicle, determines behavior information of the trailer from the modeling by reflecting a modeling factor of the vehicle and a modeling factor of the trailer in the modeling, and predicts and sets a transition of the system deactivation area based on the determined behavior information.

7. The rear-side alarm device according to claim 6, wherein the controller accumulatively stores detection data input from the sensor, estimates the status information of the trailer including at least one of information regarding a position of a longitudinal rear end of the trailer or information regarding a position of a wheel of the trailer based on the accumulated detection data, and generates the modeling factor of the trailer based on the estimated status information.

8. The rear-side alarm device according to claim 1, wherein the controller sets the system deactivation area based on information regarding at least one of a size of the trailer, a position of the trailer or a behavior of the trailer.

9. The rear-side alarm device according to claim 8, wherein the information regarding at least one of the size of the trailer, the position of the trailer or the behavior of the trailer is produced using image information obtained by an image sensor mounted to the vehicle to capture images from an area including the trailer or is set based on an input signal input via an input interface.

10. The rear-side alarm device according to claim 8, wherein the behavior information of the trailer is determined by receiving data detected by a behavior sensor mounted to the trailer.

11. The rear-side alarm device according to claim 1, wherein:
the controller sets an rear alarm area to be included in the rear area or the rear-side area of the vehicle,
the system deactivation area is set in a portion of the rear alarm area in which the alarm operation is limited, and
the system activation area is set in remaining portions of the rear alarm area, except for the system deactivation area, in which the alarm operation is performed.

12. The rear-side alarm device according to claim 1, wherein, when the vehicle turns, the controller resets the system deactivation area to be aligned with the driving direction of the vehicle.

13. The rear-side alarm device according to claim 1, wherein the controller sets one side of the trailer to be a first system activation area and an opposing side of the trailer to be a second system activation area, and
the controller sets only one of the first and second activation areas as the system activation area, depending on a driving condition of the vehicle.

14. A rear-side alarm method comprising:
monitoring a rear area or a rear-side area of a vehicle;
if a trailer connected to the vehicle is detected, setting a system deactivation area and a system activation area based on status information of the trailer; and
performing an alarm operation by judging whether or not another vehicle has entered into the system activation area,
wherein the setting a system deactivation area and a system activation area comprises resetting the system deactivation area and the system activation area based on dynamic behavior information of the trailer in a driving direction of the vehicle, and
wherein, when the vehicle turns by changing a steering angle, the controller resets the system activation area to be expanded or contracted in a width direction of the vehicle and adjusts a shape of the system deactivation area to be aligned with a moving direction of the trailer, such that the trailer is entirely inside the system deactivation area and the system deactivation area and the trailer are directed to be tangential to a direction of vehicle steering.

15. The rear-side alarm method according to claim 14, wherein the setting a system deactivation area and a system activation area further comprises
accumulatively storing detection data generated in the monitoring of the rear area of the vehicle, estimating the status information of the trailer based on the accumulated detection data, and setting the system deactivation area based on the estimated status information.

16. The rear-side alarm method according to claim 14, wherein the setting a system deactivation area and a system activation area further comprises:
accumulatively storing detection data generated in the monitoring of the rear area of the vehicle;
estimating size information regarding a size of the trailer based on the accumulated detection data, and setting a critical range of the system deactivation area based on the estimated size information; and
estimating behavior information of the trailer based on the accumulated detection data, and predicting and setting the system deactivation area based on the estimated behavior information.

17. The rear-side alarm method according to claim 14, wherein, in the setting a system deactivation area and a system activation area, the system deactivation area is set based on information regarding at least one of a size of the trailer, a position of the trailer or a behavior of the trailer.

18. The rear-side alarm method according to claim 17, wherein the information regarding at least one of the size of the trailer, the position of the trailer or the behavior of the trailer is produced using image information obtained by an image sensor mounted to the vehicle to capture images from an area including the trailer or is set based on an input signal input via an input interface.

19. The rear-side alarm method according to claim 17, wherein the behavior information of the trailer is produced by receiving data sensed by a behavior sensor provided in the trailer.

* * * * *